UNITED STATES PATENT OFFICE.

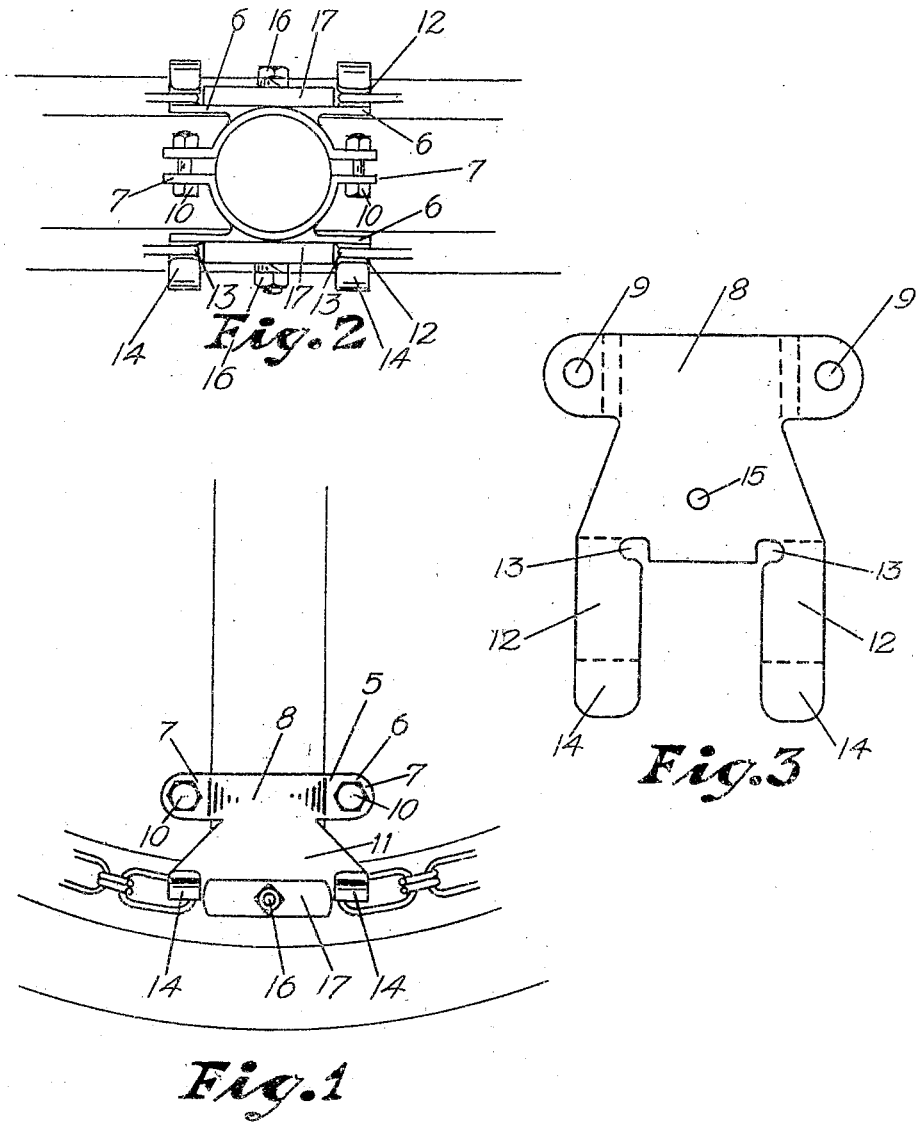

ALBERT A. ROBINSON, OF ALBIA, IOWA.

TIRE-CHAIN FASTENER.

1,330,903.

Specification of Letters Patent. Patented Feb. 17, 1920.

Application filed September 10, 1919. Serial No. 322,843.

*To all whom it may concern:*

Be it known that I, ALBERT A. ROBINSON, a citizen of the United States, residing at Albia, in the county of Monroe and State of Iowa, have invented certain new and useful Improvements in Tire-Chain Fasteners, of which the following is a specification, reference being had to the accompanying drawings.

This invention relates to tire chain fasteners, and has for its object to provide a device of this character, whereby the chain is placed on one set of hooks of the fastener and the wheels are rotated, so as to bring the remaining ends of the chains into engagement with the opposite side of the fastener.

Another object of the invention is to provide a fastener which remains permanently upon the wheel, and prevents the chain from crawling around the tire, thereby eliminating wear of the tire.

Another object of the invention is to provide a device of this character having novel chain engaging arms provided with guards, and a locking plate for locking the chains on the arms, so that it is impossible for the chains to become accidentally disengaged from the fastener.

Another object of the invention is to provide a device of this character, which permits the chain to be applied to the wheel in deep mud or sand, and without packing the wheel.

A still further object is to provide a device of this character capable of being stamped from sheet metal at a small cost.

These objects are attained by the mechanism illustrated in the accompanying drawings, in which:

Figure 1 is a side elevation of the fastener applied to a wheel.

Fig. 2 is a top plan view of the fastener applied to the wheel, showing the chains locked to the groove.

Fig. 3 is a plan view of a blank from which the fastener is made.

Referring to the drawings, 5 designates the fastener comprising a pair of brackets 6. Each bracket includes at its upper end outwardly extending wings 7, the body portion 8 of the bracket between the wings 7 being bent to conform to the shape of a wheel spoke. Openings 9 are formed in the wings 7, through which bolts 10 are passed for connecting the brackets to one another, and clamping them to the spoke. The lower portion 11 of the brackets 6 diverges from the body portion 8 and has extending from its ends a pair of arms 12. These arms are bent upwardly at right angles to the body portion 11 and are provided at their base with grooves 13. The ends of the arms 12 are bent to extend in parallel relation to the base of the arms to provide guards 14 which are intended to prevent the chains under all conditions from becoming disengaged from the arms 12. The body portion 11 is provided with an opening 15 which registers with a similar opening in the adjacent bracket. A bolt 16 is passed through the openings and the felly of the wheel and is provided at its ends with an elongated locking plate 17, which is rotatably mounted thereon. This locking plate is intended to close the opening of the grooves 13.

In the use of the fastener, the brackets are clamped to the spoke of an automobile wheel by means of the bolts 10. The bolt 15 is then passed through the felly and the locking plate positioned in alinement with the spoke. The chains are passed over the top of the guards and positioned in the grooves 13. The wheel is then rotated in any convenient manner, and the other end of the chain brought into engagement with the arms on the opposite side of the fastener, and the chains engage in the grooves 13. The locking plate 17 is then swung in parallel relation to the ends of the brackets, thereby closing the openings of the grooves 13 and securely locking the chains therein. Should the locking plate 17, or bolt 16 break, the chains will still remain in the grooves 13, but should they become disengaged from the grooves, it is impossible for the chains to leave the arms, in view of the novel form of guards 14. From the foregoing, it will be readily seen that this invention provides a novel chain fastener which permits the chain to be easily and quickly applied by any one, and when the chains are not desired, it is not necessary to remove the fastener, so that it is always in position for use. In addition to this, it is impossible for the chains to become disengaged from the fastener regardless of the conditions of the road over which the vehicle is traveling or shocks applied to the wheels, the novel locking plate and bolt 16 not only serving as additional means for holding the fastener to the wheel, but serving as a lock from the grooves 13. All of these features are contained in a device that can be stamped from sheet metal.

What is claimed is:

1. In a device of the character described, comprising a pair of brackets connected at one end to each other and clamped to the spoke of a wheel, each of said brackets including arms projecting from the lower portions thereof and disposed in engagement with the felly of the wheel, and chains engaged with the arms.

2. In a device of the character described, comprising a pair of brackets connected at one end to each other and clamped to the spoke of a wheel, each of said brackets including arms projecting from the lower portion thereof, said arms having grooves, and chains disposed in said grooves.

3. In a device of the character described, comprising a pair of brackets connected at one end to each other and clamped to the spoke of a wheel, the lower intermediate portion of each of said brackets being cut away to provide extending arms, guards carried by the arms, each arm having a groove in its inner edge portion, chains disposed in said grooves, and means carried by the brackets for locking said chains in the grooves.

4. In a device of the character described, comprising a pair of brackets, one end of each bracket being detachably secured to each other and clamped to the spoke of a wheel, the other ends of said brackets having upturned arms, guards on the ends of the arms, chains engaged with the arms and a bar pivoted to each bracket between said arms for closing the open ends of the grooves.

In testimony whereof I hereunto affix my signature.

ALBERT A. ROBINSON.